United States Patent [19]

Ritter et al.

[11] 4,221,143
[45] Sep. 9, 1980

[54] METHOD OF CUTTING GRATINGS TO LENGTH

[75] Inventors: Gerhard Ritter; Klaus Ritter; Hans Gött; Josef Ritter, all of Graz, Austria

[73] Assignee: Fa. EVG Entwicklungs-u. Verwertungs-Gesellschaft mbH., Steiermark, Austria

[21] Appl. No.: 967,407

[22] Filed: Dec. 7, 1978

[30] Foreign Application Priority Data

Sep. 8, 1978 [AT] Austria ................................. 6523/78

[51] Int. Cl.² ............................................. B23D 25/04
[52] U.S. Cl. ............................................ 83/37; 83/42; 83/71; 83/295; 83/318; 83/364; 83/620; 83/925 R

[58] Field of Search ...................... 83/37, 42, 71, 295, 83/318, 364, 620, 925 R

[56] References Cited

U.S. PATENT DOCUMENTS 3,306,144  2/1967  Nordgren .......................... 83/319 X Primary Examiner—J. M. Meister
Attorney, Agent, or Firm—Ernest F. Marmorek

[57] ABSTRACT

The invention relates to a method of cutting off sections of a grating web of any desired length by means of shears. In the event there occurs a gap between the cross-bars of a welding machine, wherein the occurrence of the gap is established by a computer, so as to enable the introduction of the cutting blades of the shears into the mesh of the grating web, the grating web is cut in response to a signal from the computer.

5 Claims, 5 Drawing Figures

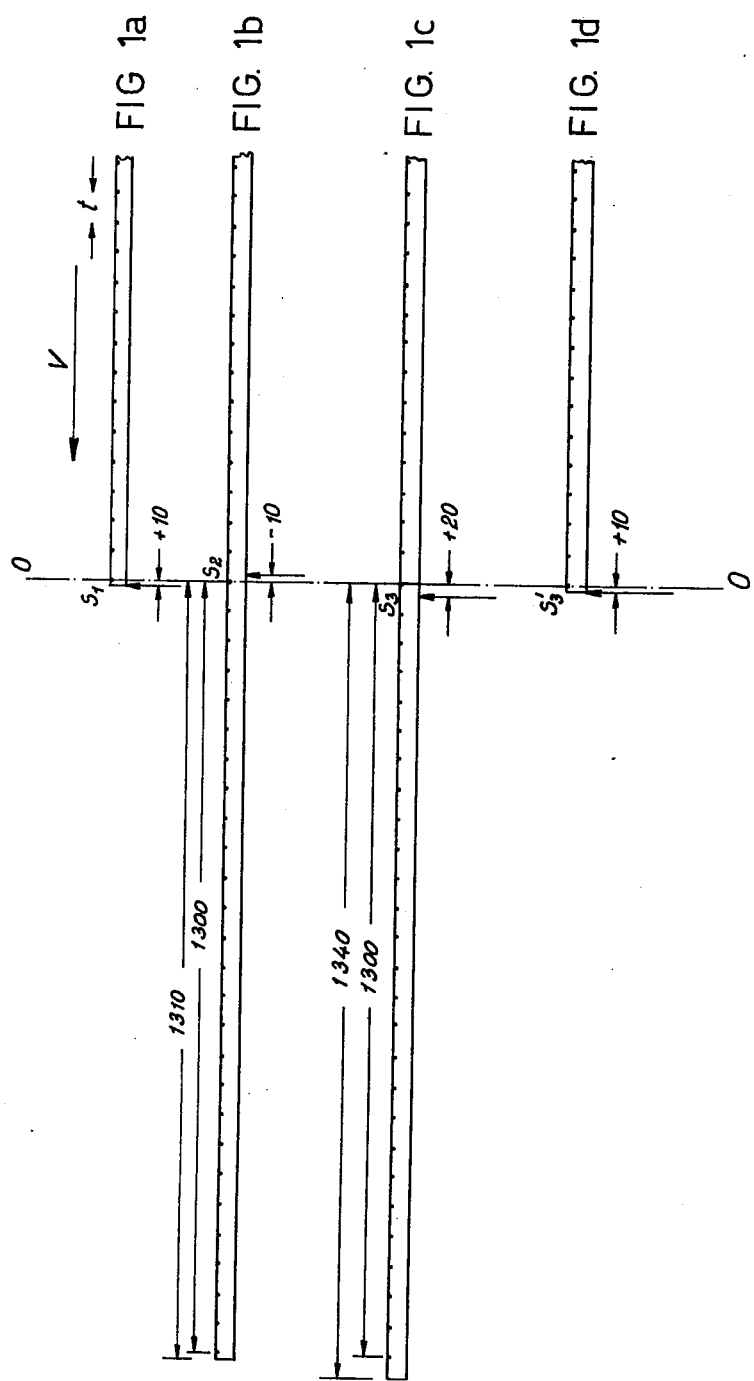

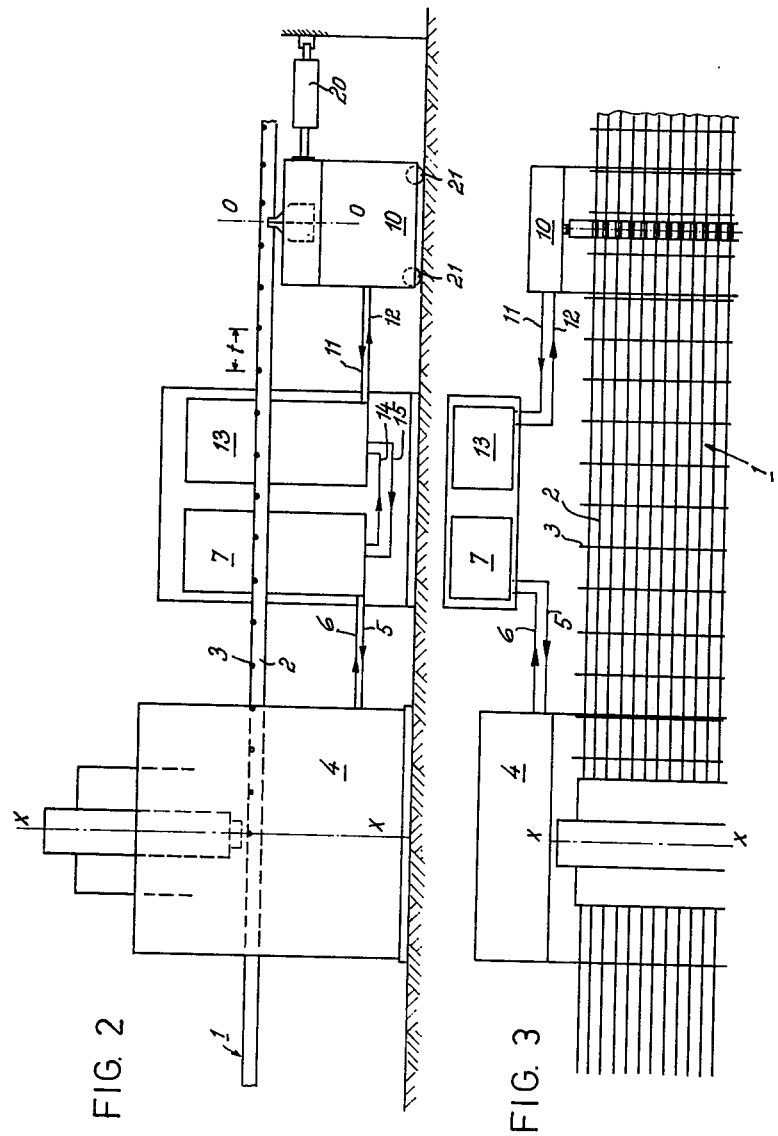

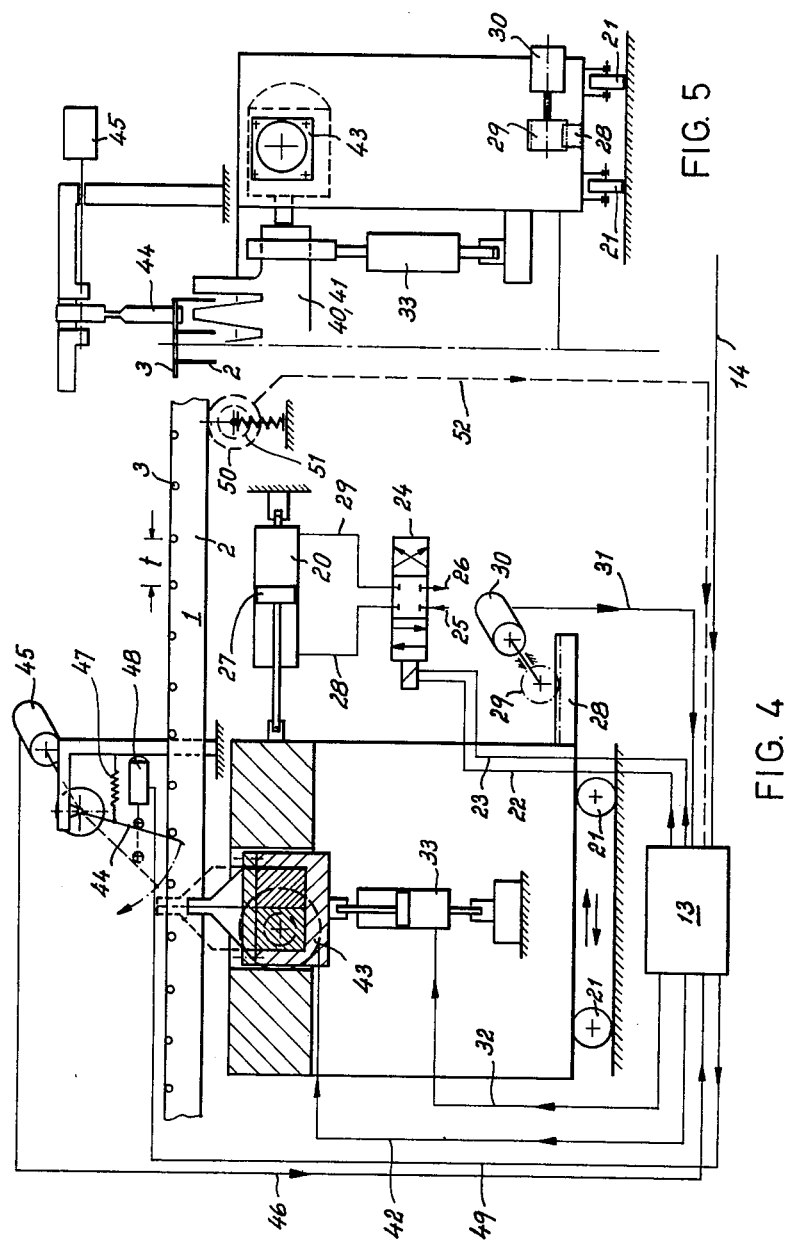

METHOD OF CUTTING GRATINGS TO LENGTH

The invention relates to a method of cutting off gratings in sections of any desired length by use of a shear which can be introduced into the plane of the grating and which has shear blades in the style of a comb, the shear blades being movable with respect to one another.

For cutting to length gratings which are formed from parallel metal straps of rectangular cross-section standing on edge and spaced at fixed distances, connected by perpendicular bars welded into their narrow sides, it has hitherto been known to use rotating circular disc cutters.

This kind of cutting to length is not only very time-consuming, because the cutter discs must sever the longitudinal components of the grating individually, but furthermore the discs also cause loud noise which is tiresome and even harmful for the operating staff.

The long time needed for each cut, in practice excludes the economical application of a known cutting mechanism of this kind to welded gratings, because the gratings have to be brought to rest during the time necessary for each cutting process and this would considerably reduce the production output of the gratings.

Thus, at the present time one is compelled to produce the gratings in fixed, manageable lengths, to store the gratings temporarily, and to cut them subsequently to the lengths required by the customer in a so-called "finishing shop" separate from the production machine.

As in the case of all production processs in which a product produced in fixed lengths must be divided up into pieces of any smaller length required for further use, this leads to considerable waste because as a rule residual pieces are left over which are shorter than are required for any use and which therefore cannot be used.

In G.B. Pat. No. 41689/78 we described a shear which can be introduced into the plane of the grating and which has comb-like shear blades movable with respect to one another to sever all longitudinal components of a grating simultaneously and in an extremely short time. Moreover such a shear causes only a dull sudden noise which is considerably less disturbing than the prolonged shriek of rotating disc cutters. The cutting process can, because of its short duration, be performed during the normal standstill time of the grating web, necessary for the welding in of the cross-bars. The production cycle of the welding machine is therefore in no way impeded by the cutting.

Of course in case of the employment of such a shear a problem arises from the fact that for each cutting process the shear must be advanced in a direction perpendicular to the plane of the grating far enough for the teeth of the comb-like shear blades to engage completely through the grating in order to enable severence of the longitudinal components of the grating to their full depth. However, this pushing of the shear through the plane of the grating is possible only at those places in the grating at which there is a gap between the cross-rods. Otherwise the shear blade on pushing the forward into the cutting position would hit against a cross-bar. The result of this is that with a shear in accordance with our earlier proposal one cannot readily sever any required length of grating from a grating web, but only sections of grating which differ in length by approximately the unit width of the mesh.

An object of the invention is to enable the cutting of gratings to length by the employment of a shear of the kind described, by means of which sections of grating of any required length, may be severed from a grating web in the production process, i.e., thus without intermediate storage of a product which is, to a certain degree, half-finished.

In accordance with the invention such a method comprises the steps of establishing by means of a computer whether, at the distance from the last cut edge of the grating web corresponding to the desired length of the next section of grating required, there is a gap between the cross-bars to enable the introduction of the cutting blades into the mesh of the grating, and in the event of an affirmative, after relative movement of the plane of cut of the shear with respect to the grating web by the desired length of the next section of grating required, cutting the web in response to a signal from the computer, and in the event of a negative, causing relative movement of the plane of cut of the shear with respect to the grating and severing a short scrap section of the grating web in response to a signal from the computer, the length of this scrap section being calculated by the computer such that at the required distance from the new cut edge, corresponding with the desired length of the next section of grating required, there is a gap between the cross-bars, whereupon after relative movement of the plane of cut of the shear with respect to the grating web by the desired length of the next section of grating required, the web is cut by the shear in response to a signal from the computer.

Such a method offers first of all the advantages of reduced nuisance from noise and also a reduced time needed for each individual cut, whereby it may be applied directly in connection with a grating welding machine.

However, this method is just as advantageous in the case of cooperation between the shear and an adjusting device in which the grating web is advanced by a separate drive.

In the case of the application of the method in connection with a grating welding machine further advantages result; that is, not only are all of the operating steps necessary to intermediate storage of the gratings eliminated, but also the waste is reduced to a fraction of that value which resulted in the case of the method of cutting made use of hitherto, because sections of grating of much greater length than was possible may be produced in one continuous operating step, whereby the number of residual pieces resulting is considerably reduced.

If the method is applied in connection with a grating welding machine in which advance of the grating is effected in steps of one pitch of the cross-bars or a multiple of it, the relative movements of the plane of cut of the shear with respect to the grating are brought about by movements of the grating in steps of the pitch of the cross-bars or an integral multiple of it and by an additional movement of the shear by the amount of the difference between the desired length of the section of grating required and the integral multiple of the pitch of the cross-bars which is closest to it.

If the method is practised in direct cooperation with a welding machine with a shear, it must be observed in addition that through the high energy fed to its during the welding process the grating suffers quite considerable thermal expansion which over the relatively short rapidly covered distance between the welding machine and the grating shear can only die away to quite a small degree.

If the severed sections of grating must exhibit exactly the desired value required after cooling off, at least one input quantity must be fed to the computer from which the temperature of the grating to be cut to length (which is raised because of the welding process) can be derived and the computer must take into consideration the temperature-dependant alteration in the desired length of the section of grating to be severed in the control of the cut.

Since one must obviously strive to keep as short as possible the section of scrap which must as a rule be cut out after a certain number of cuts from the grating web, in order to ensure the unimpeded engagement of the shear blades in a gap between cross-bars in the case of the succeeding cut, and thereby to reduce the loss of material to a minimum, the length of the scrap section severed from the grating in the event of its being necessary, is preferably selected to be at least equal to the sum of the cross-bar diameter, the total thickness measured in the direction of feed of the grating, of the end portions of the shear blades engaging in the gap between the cross-bars, and the tolerance on the pitch.

One method according to the invention will now be described in greater detail with reference to the accompanying drawings, in which:

FIG. 1 shows four working steps for the severing of sections of grating of predetermined length from a grating web;

FIG. 2 is a diagrammatic elevation of a grating welding installation cooperating with a cutting shear;

FIG. 3 is a plan view corresponding to FIG. 2;

FIG. 4 is a diagrammatic illustration of the shear with its control and driving components seen transversely to the direction of feed of the grating;

FIG. 5 is an illustration corresponding with FIG. 4 but seen in the direction of feed of the grating.

FIG. 1 illustrates the problem which is solved by the invention. The plane of cut of the shear lying in a reference position is shown by a dash-dot line 0—0. This plane of cut, designated below as the reference plane of cut, lies at a predetermined fixed distance from the welding plane of the grating welding machine. This distance must be either an intergral multiple of the pitch "t" of the cross-bars, that is, have the value n.t., where n must be a whole number, or it must have the value (n+0.5).t. The shear must be able to be shifted by at least half-a-pitch of the cross-bars on both sides of the reference plane of cut.

The advance of the grating is effected each time by a partial step equal to the pitch "t" of the cross-bars or a multiple of it, in which case this advance may be effected either directly by the grating welding machine or where necessary also by adjusting equipment.

For illustration of the processes clearly let it be assumed that the reference plane of cut is lying at the distance n.t from the welding line.

Assume that the pitch of the cross-bars amounts to t=50mm. From a grating web of great length, advanced by uniform partial steps of the size "t", sections are to be severed each time having a desired length of 1320 mm, in which case let it be further assumed that in a range of ±10 mm on both sides of the plane 0—0 no cuts are possible because of possible collision of the shear blades with a cross-bar.

As soon as the first cross-bar has reached the plane 0—0 the shear is traversed by the amount +10 mm (+ signifies in the direction of advance of the grating) and the irregulr ends of the longitudinal components are cut off level at the start of the grating (FIG. 1a).

The welding machine advances the grating web again in a uniform rhythm and these partial steps are counted, in the form of pulses emitted by the shear, by a process computer. Since the computer has recorded the state of the shear in the position +10 mm at the preceding cut, after altogether 26 feed steps it determines the total length of the section of grating which has advanced, at 1310 mm beyond the plane of cut 0—0. The process computer therefore gives the shear the order to travel into the position −10 mm and to execute a cut $S_2$ (FIG. 1b). At the same time the computer calculates the sum 50−10=40 mm, since the shear at the last cut had moved in the direction against the advance of the grating, whereby the length of the section of the longitudinal components projecting beyond the last cross-bar of the grating is determined at 40 mm.

After further counting up of 26 feed steps the length of the section of grating now projecting beyond the reference plane of cut 0—0 amounts to 1340 mm. The shear must therefore be traversed into the position +20 mm in order to sever from the grating a section of the desired length of 1320 mm by a cut $S_3$ (FIG. 1c).

Because at the last cut ($S_3$) the shear was lying in the position +20 1 mm, the overhang of the longitudinal components beyond the first cross-bar of the grating also amounts to 20 mm and after a renewed advance of the grating web by 26 partial steps the next cut would follow exactly on the plane 0—0. But a cut is not possible at this point because of the distance of the plane 0—0 from the welding line which according to the assumptions in the present example amounts to an integral multiple of t, there is a cross-bar. Therefore, the shear could not be pushed into the plane of the grating for the cut and no cut would be possible.

Therefore, directly after the cut $S_3$ and before the grating web is advanced any further the computer gives the shear the order to travel into the position +10 mm and there to execute a further cut $S'_3$ (FIG. 1d). By this cut a section of the longitudinal components of the grating 10 mm long is severed, which although it is certainly scrap, enables a new front edge of the grating to be created from which, after a further feed step, the shear can enter again into a gap between cross-bars at the distance corresponding with the desired length of the section of grating required. At the same time in the case illustrated there results again the starting position of FIG. 1a.

For the sake of completeness it may be mentioned that instead of the procedure illustrated in the preceding example in which it was assumed that the shear is traversed directly from one cutting position into the other, it would also be possible to run the shear back after each cut into the position 0—0 and to traverse it only from there again into the next cutting position. This procedure would on the one hand certainly result in twice as many steps in the movement of the shear in the embodiment above, but on the other hand it allows a considerably simpler programming of the computer.

In accordance with FIGS. 2 and 3 a grating 1, consisting of longitudinal components 2 and crossbars 3 is produced in a grating welding machine 4 and pushed forward from this in time with the production process.

The grating welding machine 4 is connected via leads 5, 6 shown only diagrammatically, to a control and switching cubicle 7 in which all of the electronic control and switching components which are necessary for the operation of the grating welding machine are combined.

At a predetermined fixed distance from the welding plane X—X of the grating welding machine lies the reference plane of cut 0—0 which corresponds with the normal position of the shear 10. The shear drive is connected via leads 11, 12 to a control and switch cubicle 13, the function of which with respect to the shear corresponds with that which the switch cubicle 7 has to fulfil with respect to the grating welding machine 4. Furthermore, the two control and switch cubicles 7 and 13 are connected together by the leads 14, 15 necessary to the cooperation of the welding machine and the shear.

The shear 10 can be traversed in the direction of feed of the grating, for example, on rollers 21, by means of an operating cylinder 20 supported fixed in space, so that the plane in which a cut is actually executed can be shifted with respect to the reference plane of cut 0—0. The distance of the plane in which a cut is executed, from the welding plane X—X can also thereby be altered.

At each welding process a pulse is emitted by the grating welding machine 4, which is passed, over the leads 6 and 14, to the control and switch cubicle 13 in which there is also accommodated a process computer (not shown). Illustration of the computer is considered superfluous because it is not the computer per se but only its function which is of concern in the present invention.

After counting up a predetermined number of pulses which correspond with the required feed travel preset in the computer, the computer in the switch cubicle 13, taking into consideration the instantaneous position of the shear, issues via the leads 23, 23 a switching command to an electrohydraulic valve 24.

The electrohydraulic valve 24 is connected on one side, via a pressure lead 25, to a pump (not shown) and on the other side via a discharge lead 26 to a sump (likewise not shown). Depending upon the position into which the electrohydraulics valve 24 is brought by the pulse from the computer, the piston 27 in the operating cylinder 20 is acted upon by pressurized fluid via leads 18, 19 whereby the shear 10 is moved out of its normal position or respectively out of its instantaneous position into the new position of cut.

To the shear 10 is connected a pulse emitter 30 which can be actuated, for example, by a rack 28 and a pinion 29 and which is likewise connected to the computer in the switch cubicle 13 via a lead 31. The computer thereby becomes capable of comprehending the exact relative position of the shear 10 with respect to the reference plane of cut 0—0.

As soon as the shear has reached its foreseen position of cut, i.e., as soon as the desired value of the shear position determined in the computer corresponds with the actual value determined in the pulse emitter 30, the command is given over a lead 32 to an operating cylinder 33 for the pushing of the shear into the plane of cut. For the sake of simplicity the lead 32 is led in the drawing directly to the operating cylinder 33. In the case of the practical construction a solenoid valve must naturally be actuated by the computer, which in a similar way to the electrohydrualic servo valve 24 is connected to the oil pump and the sump and connected by operating leads to the cylinder 33. The operating cylinder thus acted upon by oil pressure than raises the shear blades 40, 41 into the operating position shown in FIG. 4, in which they overlap the longitudinal components 2 of the grating 1 to their full depth.

As soon as the shear blades have arrived in the cutting position an answering signal is effected to the computer, from which the cutting command is now issued via a lead 42 to the operating cylinder 43, whereby the one shear blade is displaced with respect to the other by an amount which corresponds approximately with the width of tooth of the projections from the shear blade, whereby the severance of the longitudinal components 2 of the grating 1 is effected. In the case of the illustration in the drawing the same simplifications have been carried out for this system as in the case of the illustration of the operating cylinder 33.

Directly after the cut has been carried out, and which likewise is signalled back to the control cubicle 33, the shear is lowered again into its normal position so that the grating web can be advanced afresh unimpeded.

For the precise determinaton of the position of the cross-bars 3 with respect to the plane of cut of the shear as well as for taking into consideration the thermal expansion of the grating a sensor lever 44 is used, the angular positon of which is scanned via a pulse emitter 45 and reported via a lead 46 to the control and switch cubicle or respectivey to the computer in it. A spring 47 holds the sensor lever 44 in permanent contact with the cross-bars 3a lying under it.

Since the action of the sensor lever 44 is necessary only directly before the cut, the sensor lever is advantageously normally raised away from the cross-bars and always brought into contact with the cross-bar 3a only shortly before the set cut length is reached. For raising it an operating cylinder 48 is used, the action of which is controlled by the computer over a lead 49.

In the example illustrated the sensor lever with all of the parts associated with it is arranged stationary and fixed. But it would also be possible to fasten it directly to the displaceable shear frame, in which case the distance of the shear at the time from the reference plane of cut 0—0, expressed in mm, would have to be added algebraically to the measured length. When the shear is lying, regarded from the welding machine, on the far side of the reference plane of cut, the measured distance of the shear from the reference plane of cut has a positive sign, whereas if the shear is lying on the near side of the reference plane of cut, it has a negative sign.

For the case where the input data to the process computer 13, referring to the feed travel of the grating, are not derived from the feed members of a welding machine, this data as has been indicated in FIG. 4 by broken lines, may be fed to the computer via lead 52 substituting lead 14, from a measuring wheel 50 which is pressed by a spring against the grating and has an associated pulse emitter 51.

We claim:

1. A method of cutting off sections of a grating web of any desired length, said grating web comprising longitudinal elements and cross-bars, said method comprising the steps of
   (a) cutting said web by means of a shear introduced into the plane of said grating web, said shear having cutting blades in the form of comb teeth movable relative to one another;
   (b) establishing by means of a computer whether, at the distance from the last cut edge of said grating web corresponding to the desired length of the next section of grating required, there is a gap between said cross-bars to enable the introduction of said cutting blades into said grating web;

(c) in the event of said computer establishing that there is a gap between said cross-bars, causing relative movement between said shear and said grating web over said desired length of said next section of grating required and cutting said web in response to a signal from said computer; and (d) in the event of said computer establishing that there is not a gap in said cross-bars, causing relative movement between said grating and said shear over a short distance and severing a short scrap section of said grating web in response to a signal from said computer, said length of said scrap section being calculated by said computer such that, at the required distance from said new cut edge corresponding with said desired length of said next section of grating required there is a gap between said cross-bars, and causing further relative movement between said grating web and said shear over said desired length of said next section of grating required and cutting said grating web in response to a signal from said computer.

2. A method according to claim 1, for use in combination with a grating welding machine, said grating web being advanced through said grating welding machine in steps corresponding to the distance between said cross-bars or a multiple of said distance, the relative movements of said shear with respect to said grating web being carried out by said movement of said grating and by additional movement of said shear by the amount of the difference between said desired length of said section of grating next required and the integral multiple of the distance between said cross-bars which is closest to said desired length.

3. A method according to claim 1 or claim 2, in which the temperature of said grating web to be cut to length is sensed and a corresponding signal fed to said computer, said computer thereupon adjusting the length of said section to be cut to take account of said temperature whereby alteration in the length of said section to be cut is adjusted accordingly.

4. A method according to claim 1, in which said length of said scrap section severed from said grating web is at least equal to the sum of said cross-bar diameter, the total thickness measured in the driection of feed of said grating web of the end portions of said cutting blades engaging in said gap between said cross-bars, and the tolerance on the spacing between said cross-bars.

5. A method according to claim 1, in which the length of said scrap section severed from said grating web is a fraction of said distance between said cross-bars.

* * * * *